United States Patent
Nakagawa

(10) Patent No.: US 10,734,031 B2
(45) Date of Patent: Aug. 4, 2020

(54) COMMUNICATION APPARATUS, COMMUNICATION SYSTEM, COMMUNICATION METHOD, AND STORAGE MEDIUM

(71) Applicant: CANON KABUSHIKI KAISHA, Tokyo (JP)

(72) Inventor: Toshiyuki Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 15/920,317

(22) Filed: Mar. 13, 2018

(65) Prior Publication Data
US 2018/0268869 A1    Sep. 20, 2018

(30) Foreign Application Priority Data

Mar. 15, 2017   (JP) .................................. 2017-050380

(51) Int. Cl.
*G11B 27/34* (2006.01)
*G06F 3/14* (2006.01)
(Continued)

(52) U.S. Cl.
CPC ............ *G11B 27/34* (2013.01); *G06F 3/1423* (2013.01); *G06F 3/1454* (2013.01); *G06F 3/165* (2013.01);
(Continued)

(58) Field of Classification Search
CPC ........... H04N 21/439; H04N 21/43637; H04N 21/4307; H04N 21/4126; H04N 21/42207;
(Continued)

(56) References Cited

U.S. PATENT DOCUMENTS

| 2006/0127057 A1* | 6/2006 | Koyama | ................ H04N 19/44 386/270 |
| 2009/0245758 A1* | 10/2009 | Kodama | ................ H04N 5/765 386/291 |

(Continued)

FOREIGN PATENT DOCUMENTS

| EP | 3119098 A1 | 1/2017 |
| JP | 2016-71638 A | 5/2016 |

(Continued)

OTHER PUBLICATIONS

Adam Turner, Hands on: Chromecast Android Screen Mirroring, Jul. 14, 2014; http://www.smh.com.au/digital-life/computers/gadgets-on-the-go-/hands-on-chromeca . . . .

*Primary Examiner* — Loi H Tran
(74) *Attorney, Agent, or Firm* — Canon U.S.A., Inc., IP Division

(57) ABSTRACT

A communication apparatus configured to transmit information about content stored in an external apparatus is enabled to autonomously perform control based on a state based on reproduction processing of the content in a destination to which the information is transmitted. Another communication apparatus configured to receive related information about the content from the communication apparatus and perform the reproduction processing on the content based on the related information transmits information about the state related to the reproduction processing of the content. The communication apparatus receives the information about the state related to the reproduction processing of the content, and performs control based on the received information.

17 Claims, 7 Drawing Sheets

(51) Int. Cl.

| | | |
|---|---|---|
| *H04L 29/08* | (2006.01) | |
| *H04N 21/431* | (2011.01) | |
| *H04N 21/41* | (2011.01) | |
| *H04N 21/436* | (2011.01) | |
| *H04N 21/422* | (2011.01) | |
| *G06F 3/16* | (2006.01) | |
| *H04N 21/43* | (2011.01) | |
| *H04N 21/4363* | (2011.01) | |
| *H04N 21/439* | (2011.01) | |
| *H04W 84/12* | (2009.01) | |

(52) U.S. Cl.
CPC ....... *H04L 67/148* (2013.01); *H04N 21/4126* (2013.01); *H04N 21/42207* (2013.01); *H04N 21/436* (2013.01); *H04N 21/4307* (2013.01); *H04N 21/439* (2013.01); *H04N 21/4312* (2013.01); *H04N 21/4316* (2013.01); *H04N 21/43637* (2013.01); *H04W 84/12* (2013.01)

(58) Field of Classification Search
CPC ........... H04N 21/4312; H04N 21/4316; H04N 21/436; G11B 27/34; G06F 3/165; G06F 3/1423; G06F 3/1454; H04L 67/148; H04W 84/12

USPC ........................................................ 386/248
See application file for complete search history.

(56) References Cited

U.S. PATENT DOCUMENTS

| | | | |
|---|---|---|---|
| 2010/0169955 A1* | 7/2010 | Happonen | G06F 3/01 726/4 |
| 2011/0154214 A1 | 6/2011 | Mahajan | |
| 2012/0042102 A1 | 2/2012 | Chung | |
| 2012/0328261 A1* | 12/2012 | Matsunaga | G11B 27/105 386/230 |
| 2015/0095510 A1 | 4/2015 | Bhorkar | |
| 2018/0324876 A1* | 11/2018 | Iwami | H04W 84/12 |
| 2019/0132635 A1* | 5/2019 | Heo | H04N 21/433 |

FOREIGN PATENT DOCUMENTS

| | | | |
|---|---|---|---|
| KR | 10-2016-0031724 A | 3/2016 | |
| WO | 2014/182411 A1 | 11/2014 | |
| WO | 2017/183831 A1 | 10/2017 | |
| WO | WO-2017222097 A2 * | 12/2017 | ........... H04N 21/433 |

* cited by examiner

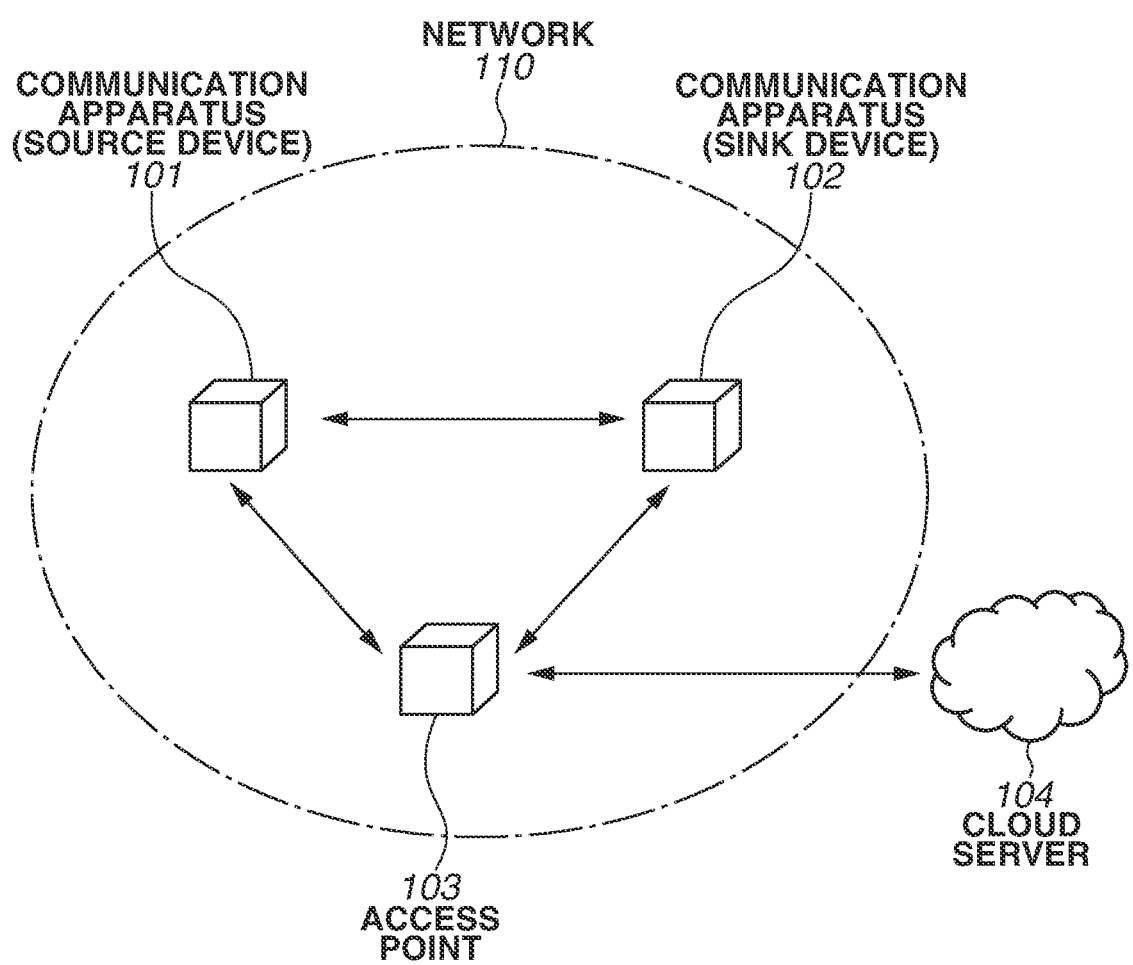

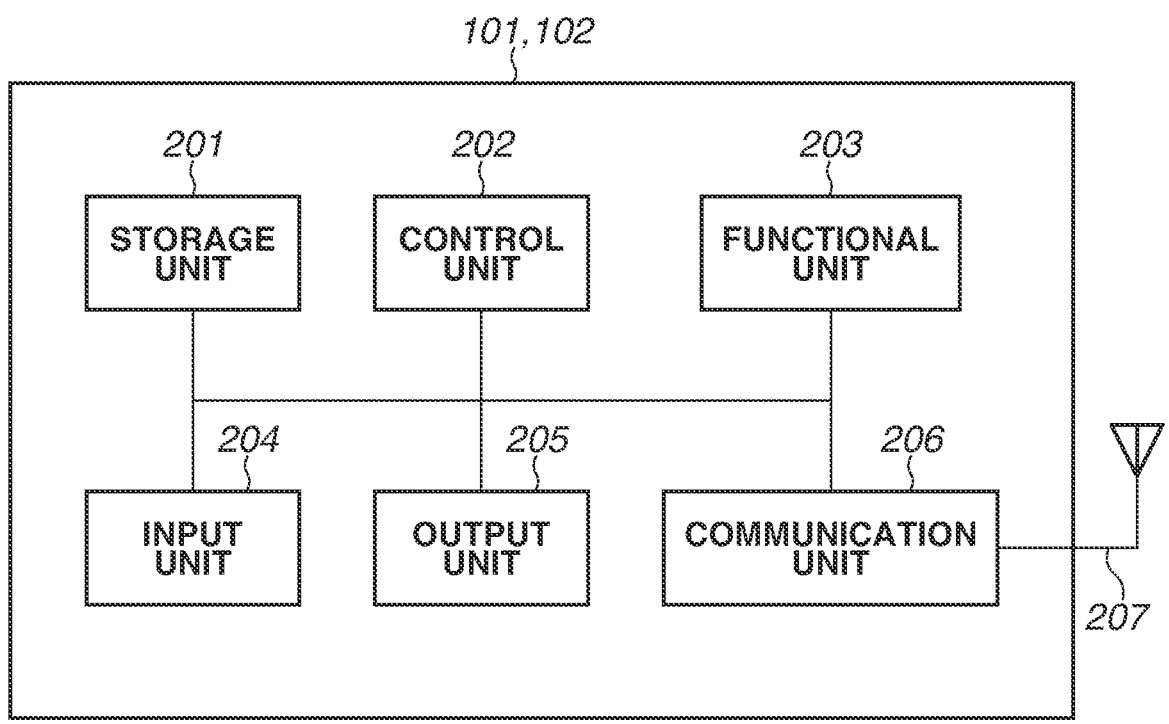

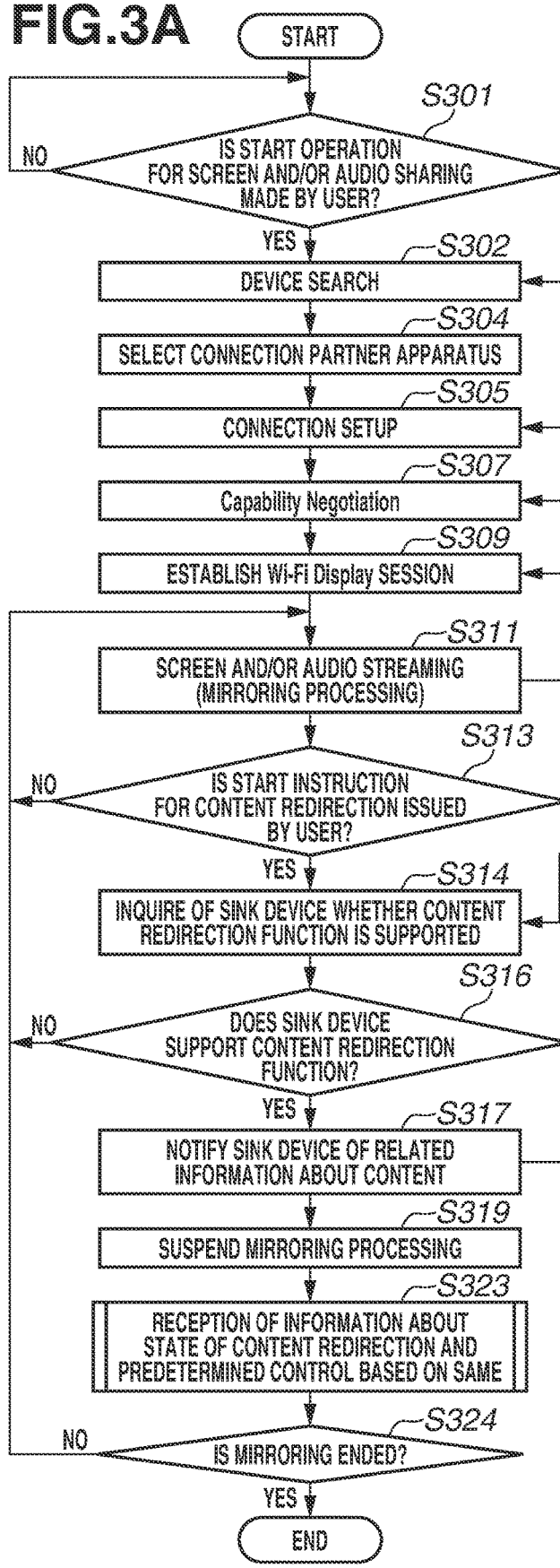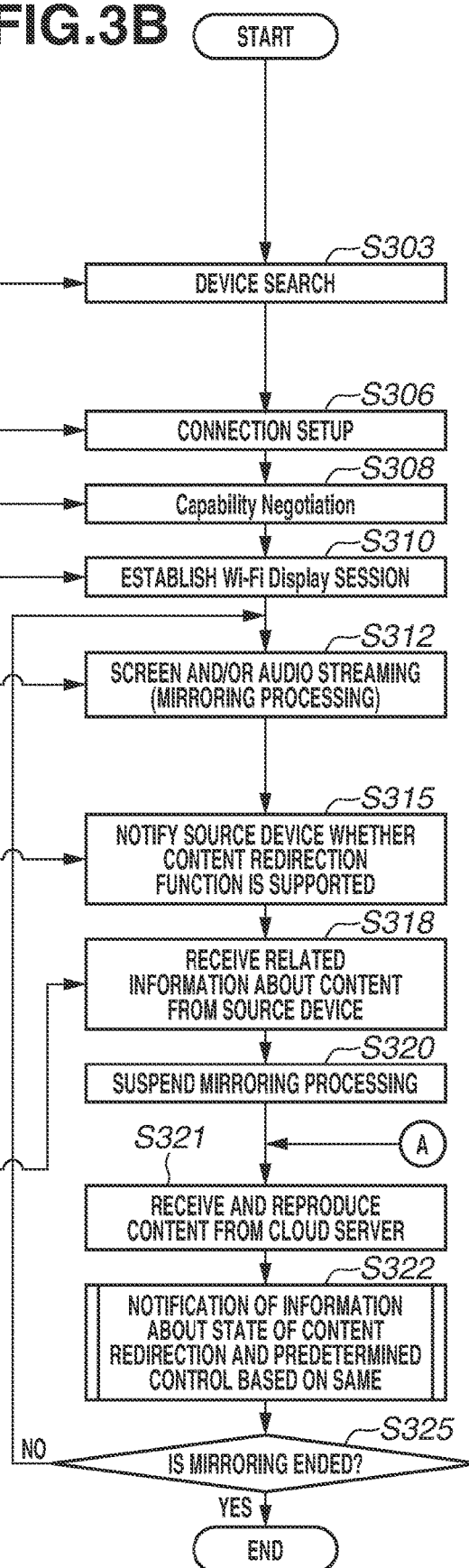

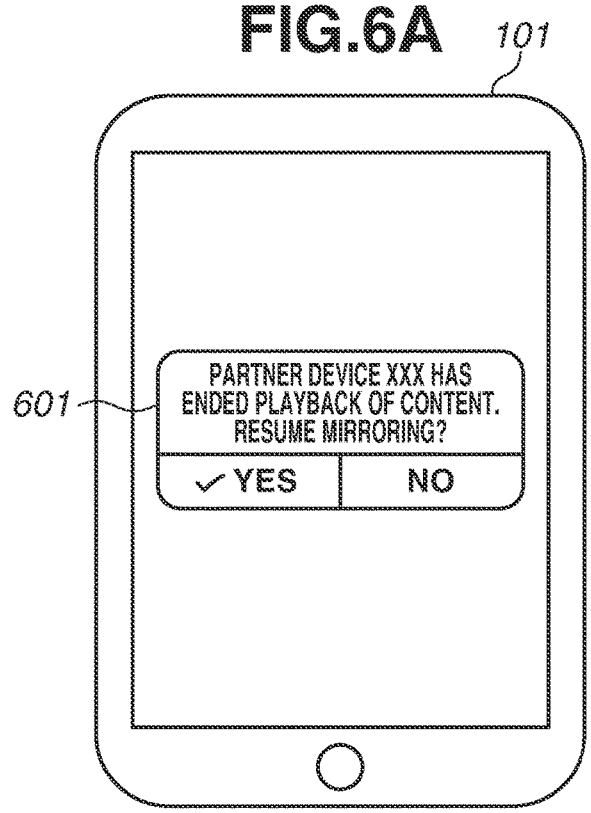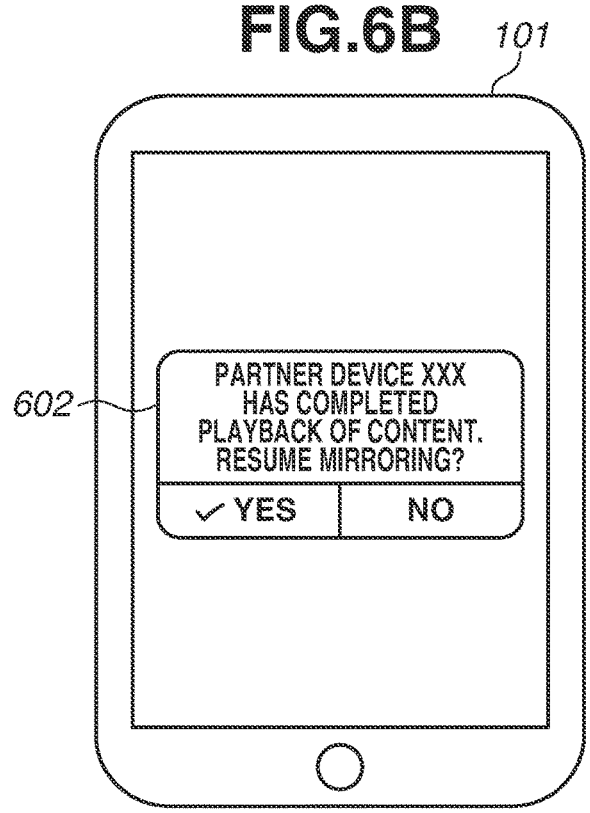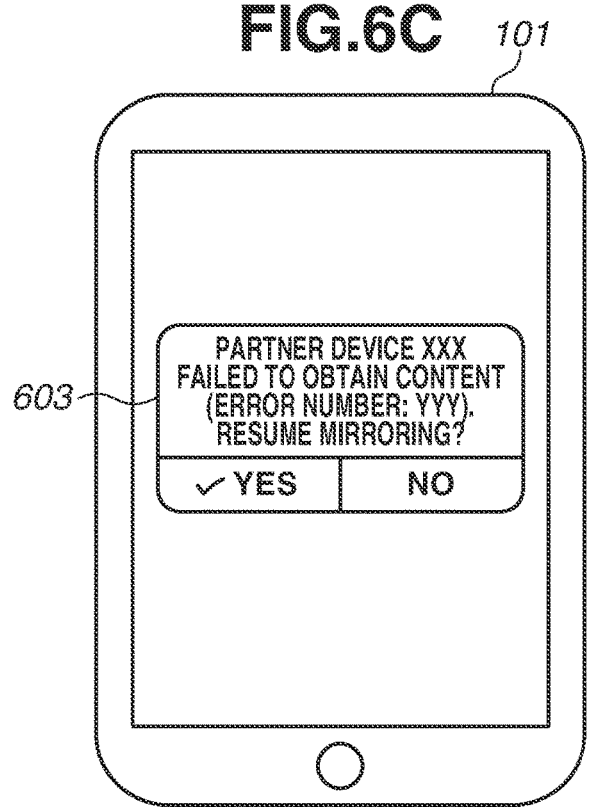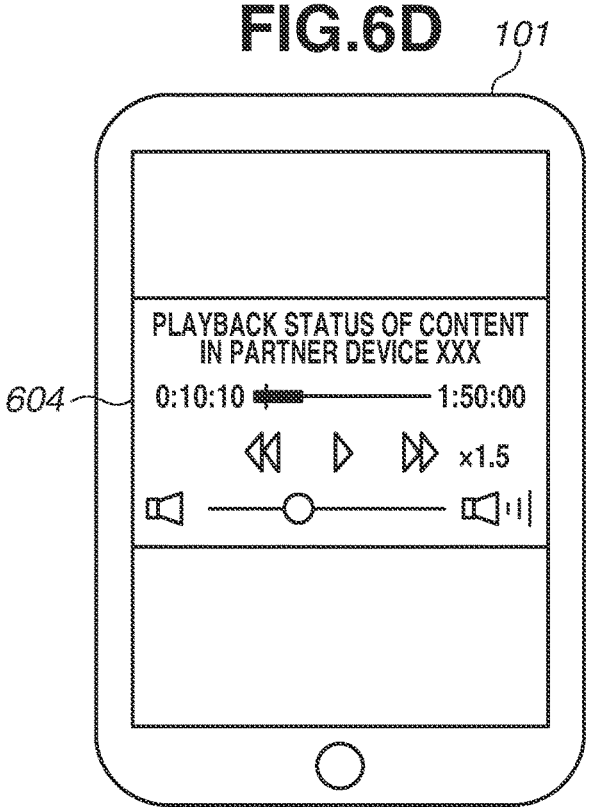

COMMUNICATION APPARATUS, COMMUNICATION SYSTEM, COMMUNICATION METHOD, AND STORAGE MEDIUM

BACKGROUND

Field of the Invention

The present disclosure relates to communication between a plurality of apparatuses.

Description of the Related Art

A technique for wirelessly mirroring a screen being displayed and audio being reproduced by a communication apparatus has been standardized as Wi-Fi® Display (Miracast). The mirroring refers to a technique for transmitting information about a screen being displayed and audio being reproduced by a transmission apparatus to a reception apparatus via a network, whereby the screen being displayed and the audio being reproduced are shared between the transmission and reception apparatuses. Wi-Fi® Display defines a source device and a sink device. The source device transmits information about a screen being displayed and audio being reproduced. The sink device receives the information about the screen and/or audio from the source device.

Japanese Patent Application Laid-Open No. 2016-71638 discusses the foregoing mirroring function and a content redirection function by which a sink device obtains and displays content from an external apparatus other than a source device. According to the content redirection function, the source device transmits information about the content stored in the external apparatus to the sink device, and the sink device obtains and reproduces the content from the external apparatus.

According to Japanese Patent Application Laid-Open No. 2016-71638, to control the content redirection function of the sink device, the user needs to operate the source device to transmit instruction information from the source device to the sink device. Since the source device does not comprehend the state of content redirection (such as under reproduction, an end, and an error) in the sink device, the source device is unable to autonomously perform control according to the state of content redirection. The user has therefore needed to find out the state of content redirection in the sink device and appropriately operate the source device.

SUMMARY

The present disclosure is directed to enabling an apparatus configured to transmit information about content stored in an external apparatus to autonomously perform control based on a state related to reproduction processing of the content in a destination to which the information is transmitted.

According to an aspect of the present invention, a communication apparatus includes a first transmission unit configured to transmit at least screen data on a screen being displayed or audio data from audio being reproduced by the communication apparatus to another communication apparatus, a second transmission unit configured to transmit related information about content stored in an external apparatus from the communication apparatus to the another communication apparatus, a stopping unit configured to, in a case where at least the screen data or the audio data is being transmitted by the first transmission unit, stop transmission by the first transmission unit after the second transmission unit transmits the related information about the content, a first reception unit configured to, in a case where the transmission by the first transmission unit is stopped, receive information about a state related to reproduction processing of the content from the another apparatus, the reproduction processing being performed in the another communication apparatus based on the related information about the content, and a control unit configured to, in a case where the first reception unit receives information indicating an end of the reproduction processing of the content in the another communication apparatus as the information, perform control to resume the transmission by the first transmission unit that was stopped.

Further features will become apparent from the following description of exemplary embodiments with reference to the attached drawings.

BRIEF DESCRIPTION OF THE DRAWINGS

FIG. 1 is a diagram illustrating a network configuration of a communication system.

FIG. 2 is a diagram illustrating a hardware configuration of a communication apparatus and a communication apparatus.

FIGS. 3A and 3B are flowcharts to be implemented when the communication apparatuses perform content redirection.

FIGS. 6A, 6B, 6C, and 6D are diagrams illustrating display screens displayed by the communication apparatus.

DESCRIPTION OF THE EMBODIMENTS

Figure 4A:
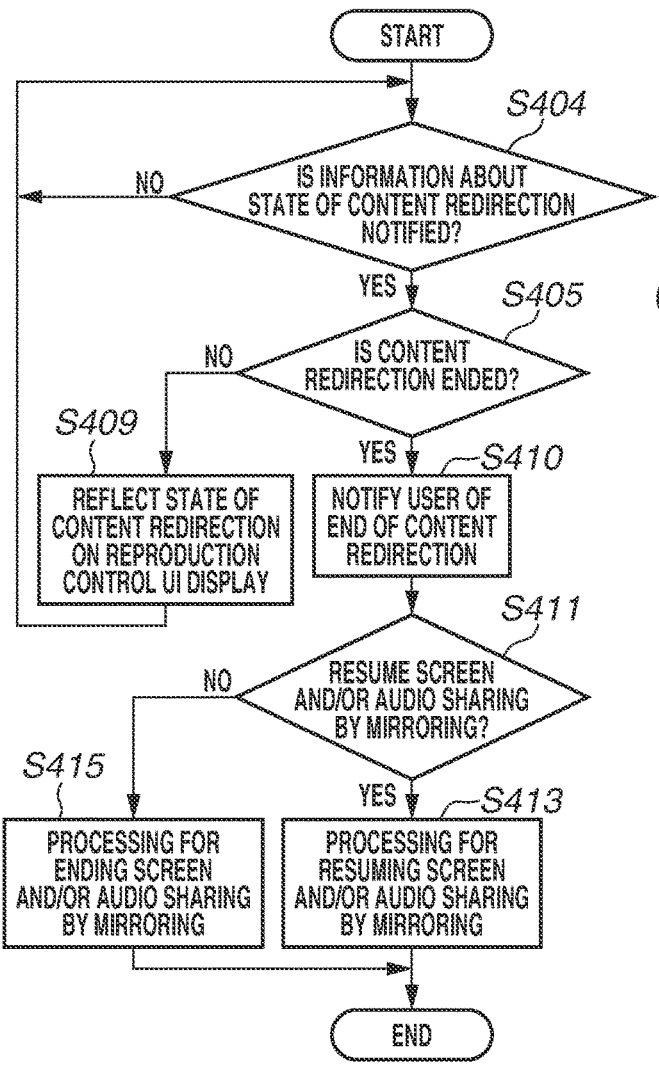
FIGS. 4A and 4B are flowcharts to be implemented when the communication apparatus notifies the communication apparatus of information about a state of the content redirection.

Exemplary embodiments will be described in detail below with reference to the accompanying drawings. Configurations described in the following exemplary embodiments are merely examples are not seen to be limiting.

A first exemplary embodiment will be described below. FIG. 1 illustrates a network configuration of a communication system according to the present exemplary embodiment. Apparatuses on a network 110 perform communication by a wireless communication method compliant with the Institute of Electrical and Electronics Engineers (IEEE) 802.11 series standards. In the present exemplary embodiment, a communication apparatus 101 and a communication apparatus 102 communicate directly with each other. However, this is not restrictive, and the communication apparatuses 101 and 102 may communicate via an access point 103.

Communication methods compliant with other wireless communication methods, such as Bluetooth (registered trademark), short-range wireless communication, ultra-wideband (UWB), Zigbee, and Multiband Orthogonal Frequency-Division Multiplexing (OFDM) Alliance (MBOA), may be used on the network 110. Examples of the short-range wireless communication include near field communication (NFC). UWB methods include Wireless Universal Serial Bus (USB), Wireless 1394, and WiNET. Communication methods compliant with wired communication methods, such as a wired local area network (LAN), are also applicable.

In the present exemplary embodiment, the communication apparatuses 101 and 102 perform mirroring based on the Wi-Fi® Display specification, with the communication apparatus 101 as a transmission apparatus and the communication apparatus 102 as a reception apparatus. The transmission apparatus and the reception apparatus perform data transmission processing and reception processing, respectively, based on the Wi-Fi® Display specification. The Wi-Fi® Display is not restrictive, and the transmission and reception apparatuses may perform mirroring by using other communication methods. In the mirroring based on the Wi-Fi® Display, information about a screen being displayed and audio being reproduced by a source device is transmitted to a sink device via a network. The sink device displays the received screen and reproduces the received audio in synchronization with the source device. In other words, the screen being displayed and the audio being reproduced are shared and reproduced by the transmission apparatus and the reception apparatus. In the present exemplary embodiment, the communication apparatus 101 transmits information about a screen being displayed and audio being reproduced by the own apparatus to the communication apparatus 102. The communication apparatus 102 receives and reproduces the information about the screen being displayed and the audio being reproduced by the communication apparatus 101, transmitted from the communication apparatus 101. That is, the communication apparatus 101 plays the role of a source device in the Wi-Fi® Display, and the communication apparatus 102 plays the role of a sink device.

In the present exemplary embodiment, Wi-Fi® Peer-to-Peer (P2P) (Wi-Fi Direct®) is used for a wireless connection between the communication apparatuses 101 and 102 according to the Wi-Fi® Display specification. However, this is not restrictive. The wireless connection may be made by using an infrastructure mode defined in the IEEE 802.11 series.

Specific examples of the communication apparatus 101 may include, though not limited to, input apparatuses such as a tablet, a smartphone, a personal computer (PC), a mobile phone, a camera, and a video camera. Specific examples of the communication apparatus 102 may include, though not limited to, output apparatuses such as a tablet, a smartphone, a PC, a mobile phone, a television set, a head-mounted display, a projector, a display, and a car navigation system.

The communication apparatus 101 (source device) and the communication apparatus 102 (sink device) can use a content redirection function. By the content redirection function, the source device causes the sink device to obtain content from an external apparatus other than the source device, and causes the sink device to reproduce the content. The source device further transmits information needed to obtain the content from the external apparatus to the sink device.

In the present exemplary embodiment, the communication apparatus 101 transmits, as the needed information, related information about content on a cloud server 104 (for example, a content identifier or location information (such as a Uniform Resource Identifier (URI) and a Uniform Resource Locator (URL)) about the content) to the communication apparatus 102. As employed herein, the content identifier refers to an identifier for uniquely determining the content. The communication apparatus 102 receives and reproduces the content on the cloud server 104 via the access point 103, which has a router function, based on the related information about the content, received from the communication apparatus 101.

FIG. 2 illustrates a hardware configuration of the communication apparatus 101.

The communication apparatus 101 includes a storage unit 201, a control unit 202, a functional unit 203, an input unit 204, an output unit 205, a communication unit 206, and an antenna 207.

The storage unit 201 includes one or more memories such as a read-only memory (ROM) and a random access memory (RAM). The storage unit 201 stores a computer program for performing various operations to be described below and various types of information such as a communication parameter for wireless communication. Aside from memories such as a ROM and a RAM, a storage medium such as a flexible disk, a hard disk, an optical disk, a magneto-optical disk, a Compact Disc Read-Only Memory (CD-ROM), a Compact Disc-Recordable (CD-R), a magnetic tape, a nonvolatile memory card, and a digital versatile disc (DVD) may be used for the storage unit 201. The storage unit 201 may include a plurality of memories.

The control unit 202 includes one or more processors such as a central processing unit (CPU) and a micro processing unit (MPU). The control unit 202 controls the entire communication apparatus 101 by executing the computer program stored in the storage unit 201. The CPU and/or the MPU functions as a computer. The control unit 202 implements a mirroring function and a content redirection function as a source device by executing the computer program stored in the storage unit 201. As employed herein, the mirroring function as a source device refers to a function of transmitting encoded screen data and encoded audio data to a sink device. The encoded screen data is obtained by capturing and encoding a screen being displayed on the own apparatus. The content redirection function as a source device refers to a function of transmitting, to a sink device, information needed for the sink device to obtain content to be reproduced by the sink device from an external apparatus other than the source device. The control unit 202 may control the entire communication apparatus 101 through cooperation of the computer program stored in the storage unit 201 and an operating system (OS). The control unit 202 may include a plurality of processors like a multi-core, and the plurality of processors may control the entire communication apparatus 101.

The control unit 202 controls the functional unit 203 to perform predetermined processing such as imaging and browsing of content. The functional unit 203 is hardware intended for the communication apparatus 101 to perform predetermined processing. For example, if the communication apparatus 101 is a camera, the functional unit 203 is an imaging unit and performs imaging processing. Here, data generated by the imaging unit is displayed onscreen by the output unit 205 and transmitted to another communication apparatus by the mirroring function of the control unit 202 for mirroring.

The input unit 204 accepts various operations from the user. The output unit 205 makes various outputs to the user via a monitor screen and a speaker. Aside from display on the screen, the outputs of the output unit 205 may include audio output from the speaker and vibration output. The input unit 204 and the output unit 205 both may be implemented by one module like a touch panel.

The communication unit 206 performs control of wireless communication compliant with the IEEE 802.11 series, control of wired communication such as a wired LAN, and control of Internet Protocol (IP) communication. The communication unit 206 also controls the antenna 207 to transmit and receive wireless signals for wireless communication. The communication apparatus 101 communicates content such as image data, document data, audio data, and video data with the communication apparatus 102 via the communication unit 206.

The communication apparatus 102 has a hardware configuration similar to that of the communication apparatus 101. A storage unit 201, a functional unit 203, an input unit 204, an output unit 205, a communication unit 206, and an antenna 207 of the communication apparatus 102 are similar to those of the communication apparatus 101. A description thereof will thus be omitted.

A control unit 202 of the communication apparatus 102 includes one or more processors such as a CPU and an MPU, and controls the entire communication apparatus 102 by executing a computer program stored in the storage unit 201. The CPU and/or the MPU functions as a computer. The control unit 202 of the communication apparatus 102 implements a mirroring function and a content redirection function as a sink device by executing the computer program stored in the storage unit 201. As employed herein, the mirroring function as a sink device refers to a function of receiving, decoding, and reproducing encoded image data and encoded audio data. The encoded image data is obtained by capturing and encoding a screen being displayed on a source device. The content redirection function as a sink device refers to a function of obtaining and reproducing content to be reproduced from other than a source device, based on information transmitted from the source device. The control unit 202 of the communication apparatus 102 may control the entire communication apparatus 102 through cooperation of the computer program stored in the storage unit 201 and an OS. The control unit 202 of the communication apparatus 102 may include a plurality of processors like a multi-core, and the plurality of processors may control the entire communication apparatus 102.

In the present exemplary embodiment, the communication apparatuses 101 and 102 are capable of both image display and audio reproduction. However, the communication apparatuses 101 and 102 each may be only capable of either image display or audio reproduction.

FIGS. 3A and 3B illustrate flowcharts to be implemented by the communication apparatuses 101 and 102 when the communication apparatuses 101 and 102 perform content redirection. FIG. 3A is the flowchart to be implemented by the communication apparatus 101. FIG. 3B is the flowchart to be implemented by the communication apparatus 102. The flowchart illustrated in FIG. 3A is implemented by reading and executing the computer program stored in the storage unit 201 of the communication apparatus 101 by the control unit 202. The flowchart illustrated in FIG. 3B is implemented by reading and executing the computer program stored in the storage unit 201 of the communication apparatus 102 by the control unit 202.

At least part or all of the flowcharts illustrated in FIGS. 3A and 3B may be implemented by hardware. For example, a dedicated circuit may be generated on a field programmable gate array (FPGA) from the computer program for implementing the steps by using a predetermined compiler, and used for hardware implementation. Like an FPGA, a gate array circuit may be formed for hardware implementation. An application specific integrated circuit (ASIC) may be used for implementation.

The flowchart of FIG. 3A is started when the source device (communication apparatus 101) is powered on. The flowchart of FIG. 3A may be started according to activation of a predetermined application on the source device. The flowchart of FIG. 3B is started when the sink device (communication apparatus 102) is powered on. The flowchart of FIG. 3B may be started according to activation of a predetermined application on the sink device.

In step S301, the source device initially determines whether a start operation for screen and/or audio sharing is made by the user from the input unit 204. An example of the start operation is pressing of a control button for starting the screen and/or audio sharing by the user. If the start operation is not made (NO in step S301), the processing returns to step S301 and the source device makes the determination again.

If the start operation is made (YES in step S301), the processing proceeds to step S302. Here, the source device and the sink device perform a device search therebetween. Specifically, in step S302, the source device transmits a Probe Request compliant with the IEEE 802.11 series as a device discovery request. In step S303, the sink device receiving such a signal transmits a Probe Response compliant with the IEEE 802.11 series as a response to the signal. The source device and the sink device thereby find each other. A list of found devices is displayed on the source device. In step S304, the user selects a connection partner apparatus (sink device) from the list of devices.

The sink device may transmit a Probe Request and the source device may transmit a Probe Response to find each other. The user may select a connection partner apparatus from the sink device.

Based on the Wi-Fi® Display specification, the signal used for the device search may be a wireless signal such as a beacon compliant with the IEEE 802.11 series. The source device can find the connection partner apparatus by using NFC, Quick Response (QR) code (registered trademark), and Bluetooth Low Energy (BLE). For example, if the source device has an NFC communication function, the source device and the sink device may be paired up by an NFC touch operation, and subsequent communication may be performed based on the Wi-Fi® Display standard.

The source device and the sink device may perform a service search before the processing proceeds to steps S305 and S306. The service search is performed based on the Wi-Fi® P2P specification. The service search allows at least either one of the source and sink devices to obtain information about a service provided by the partner apparatus.

In step S305, the source device performs a connection setup with the sink device that is the connection partner device (partner device) selected in step S304. In step S306, the sink device simultaneously performs a connection setup with the source device. Specifically, the source and sink devices perform Wi-Fi® Display connection processing, and then perform Transmission Control Protocol (TCP) connection processing. Such connection processing completes the connection setup.

A method for establishing a Wi-Fi® Display connection can be selected from two types of methods, namely, Wi-Fi® P2P and Tunneled Direct Link Setup (TDLS). In the present exemplary embodiment, a Wi-Fi® Display connection is established according to the Wi-Fi® P2P specification.

Now, detailed procedures of steps S305 and S306 will be described. The sink device initially transmits a Probe Request to the source device. Receiving the Probe Request, the source device transmits a Probe Response to the sink device. The source device and the sink device thereby confirm the presence of each other's partner apparatuses. To determine a group owner (GO), the source device then transmits a GO Negotiation Request. This signal includes an Intent value of the source device. The device serving as the GO plays a role similar to that of an access point in Wi-Fi®

P2P wireless communication. The device not serving as the GO serves as a client and plays a role as a station.

As a response to the GO Negotiation Request, the sink device transmits a GO Negotiation Response. This signal includes an Intent value of the sink device. The communication apparatuses 101 and 102 compare the intent values of the sink and source devices in magnitude. The device having a larger Intent value serves as a GO. In the present exemplary embodiment, the source device serves as a GO. The sink device may serve as a GO. The source device finally transmits GO Negotiation Confirm to the sink device, whereby the role of each of the source and sink devices, whether to serve as a GO or a client, is determined. Suppose here that the source device is determined to serve as a GO, and the sink device a client.

The source and sink devices then share parameter information needed to establish a network connection therebetween, such as connection- and security-related information, by using a Wi-Fi® Protected Setup™ (WPS) method. Based on the exchanged parameter information, the sink device serving as the client transmits an Association Request to the source device serving as the GO. Receiving this signal, the source device transmits an Association Response as a response.

In such a manner, a Wi-Fi® Display connection according to the Wi-Fi® P2P specification, i.e., a Wi-Fi® P2P connection is established between the source and sink devices. The roles (GO and client) of the sink and source devices may be switched in terms of which devices transmit the respective wireless signals mentioned above. The Wi-Fi® Display connection may be established by using wireless signals other than the foregoing. Specifically, a beacon, a Reassociation message, a P2P Invitation message, and a Provision Discovery message may be used.

Next, the source and sink devices establish a TCP connection. The TCP connection is established by a 3-way handshake with the source device as a TCP server and the sink device a TCP client.

In such a manner, the Wi-Fi® Display connection and the TCP connection are established, whereby the connection setups are completed.

In step S307, the source device performs capability negotiation. In step S308, the sink device also performs capability negotiation. According to the Wi-Fi® Display specification, the capability negotiation is defined to use the Real Time Streaming Protocol (RTSP). RTSP is a protocol for controlling streaming. TCP is typically used as a transport protocol in the lower layer. In the capability negotiation, predetermined messages RTSP M1 to M4 are exchanged between the source and sink devices. By the exchange of the RTSP messages, the source device obtains capability information about the sink device, determines parameters to be used, and notifies the sink device of the parameters. The sink device sets the notified parameters. Specific examples of capability information about a screen include information about resolution of the corresponding screen, a frame rate, and a codec. Specific examples of capability information about audio include information about a corresponding codec and a sampling frequency. As a result of the capability negotiation in steps S307 and S308, the types of screen and/or audio encoding methods, the resolution of the video image, and the frame rate to be used during mirroring between the source and sink devices are determined. The transmitted and received capability information may be part of such information.

In step S309, with the capability negotiation completed, the source device establishes a Wi-Fi® Display session. In step S310, the sink device also establishes the Wi-Fi® Display session. According to the Wi-Fi® Display specification, the source and sink devices exchange predetermined messages RTSP M5 to M7 in establishing the Wi-Fi® Display session. By the exchange of the RTSP messages, a port number to be used is set and the Wi-Fi® Display session is established.

In step S311, after the end of the RTSP message exchange in steps S309 and S310, the source device performs mirroring processing. The mirroring processing in the source device includes, for example, capturing of the screen being displayed, encoding of the captured image, multiplexing, and data transmission processing. In step S312, the sink device similarly performs mirroring processing. The mirroring processing in the sink device includes, for example, data reception, demultiplexing, decoding of the captured image, and reproduction processing of the decoded captured image. By such processing, a stream (screen and/or audio stream) of information about the screen being displayed and the audio being reproduced by the source device is transmitted from the source device to the sink device.

According to the Wi-Fi® Display specification, the Real-time Transport Protocol (RTP) is used as a protocol for the screen and/or audio stream. RTP is a protocol for transmitting and receiving multimedia data, such as a moving image and audio, via a network in real time. The User Data Protocol (UDP) is used as a transport protocol in the lower layer.

In step S313, the source device determines whether a start instruction for content redirection is issued by the user from the input unit 204. For example, the start instruction for content redirection can be issued by an operation in which the user selects content intended for a content redirection service (content on the cloud server 104) from the source device. Alternatively, the start instruction can be issued by an operation in which the user inputs information needed for the sink device to identify the content. The start instruction may be issued by the user making a predetermined operation during playback of content.

If a start instruction for content redirection is not issued by the user (NO in step S313), the processing returns to step S311. In step S311, the source device continues the mirroring processing. If a start instruction for content redirection is issued by the user (YES in step S313), the processing proceeds to step S314. In step S314, the source device inquires of the sink device whether a content redirection function is supported. In step S315, the sink device receiving the inquiry notifies the source device, as a response, of information about whether the content redirection function is supported and the name of a moving image sharing service that the sink device can reproduce by the content redirection function.

In step S316, the source device determines whether the sink device supports the content redirection function. The determination here may be made based on the content of the response transmitted from the sink device in the foregoing step S315.

In step S316, if it is determined that the sink device does not support the content redirection function (NO in step S316), the processing returns to step S311. In step S311, the source device continues to transmit the screen and/or audio stream. Here, at least either one of the source and sink devices may notify the user that the sink device does not support the content redirection function.

In step S316, if it is determined that the sink device supports the content redirection function (YES in step S316), the processing proceeds to step S317. In step S317, the source device notifies the sink device of related information about the content. In step S318, the sink device receives the related information about the content, transmitted from the source device. Examples of the related information about the content to be transmitted and received here include information about an identifier for identifying the content on the cloud server 104, a service name, location information (URI or URL) about the content, and reproduction start time (offset). The related information about the content to be transmitted and received may be part of such information.

In step S319, the source device made ready to start content redirection by the processing up to the foregoing step S318 suspends the mirroring processing in operation to restrict the transmission of the screen. In step S320, the sink device also suspends the mirroring processing in operation. If content redirection is performed during mirroring, the processing load of the mirroring on each of the source and sink devices can be reduced to suppress power consumption by suspending the mirroring processing.

The suspension of the mirroring processing is triggered by a message exchange which is performed by the transmission and reception of the related information about the content in steps S317 and S318.

In step S321, the sink device receives and reproduces the content from the cloud server 104 based on the related information about the content, received in step S318. Here, the sink device receives the content from the cloud server 104 via the access point 103.

There are various methods and protocols for content reception, depending on the type of content and the type of service. For example, the Hypertext Transfer Protocol (HTTP) Live Streaming (HLS) and an HTTP GET method may be used.

After the reception and a start of reproduction of the content by the content redirection, the processing proceeds to step S322. In step S322, the sink device detects a state of the content redirection, and notifies the source device of information about the state. In step S323, the source device receives the information about the state of the content redirection from the sink device. Both the sink and source devices then perform predetermined control according to the state of the content redirection. Details of the processing in steps S322 and S323 will be described below with reference to FIGS. 4A, 4B, 5A, and 5B.

In steps S324 and S325, the source device and the sink device respectively determine whether the mirroring is ended. The mirroring can be ended in respective steps S322 and S323.

In step S324, if the mirroring is determined to be ended (YES in step S324), the flowchart illustrated in FIG. 3A ends. Similarly, in step S325, if the mirroring is determined to be ended (YES in step S325), the flowchart illustrated in FIG. 3B ends.

In step S324, if it is determined that the mirroring is not ended (NO in step S324), the processing returns to step S311. In step S311, the source device resumes the suspended mirroring processing. Similarly, in step S325, if is determined that the mirroring is not ended (NO in step S325), the processing returns to step S312. In step S312, the sink device resumes the suspended mirroring processing.

As has been described above, the flowcharts of FIGS. 3A and 3B illustrate the processing for the source and sink devices to implement in performing content redirection.

FIGS. 4A, 4B, 5A, and 5B illustrate the processing to be performed in steps S322 and S323 of FIGS. 3A and 3B described above. In FIGS. 4A, 4B, 5A, and 5B, the sink device detects the state of the content redirection and notifies the source device of the information about the state. The sink device and the source device then perform respective predetermined controls according to the state of the content redirection. FIGS. 6A, 6B, 6C, and 6D illustrate examples of display screens displayed by the source device in FIGS. 4A, 4B, 5A, and 5B.

Figure 4B:
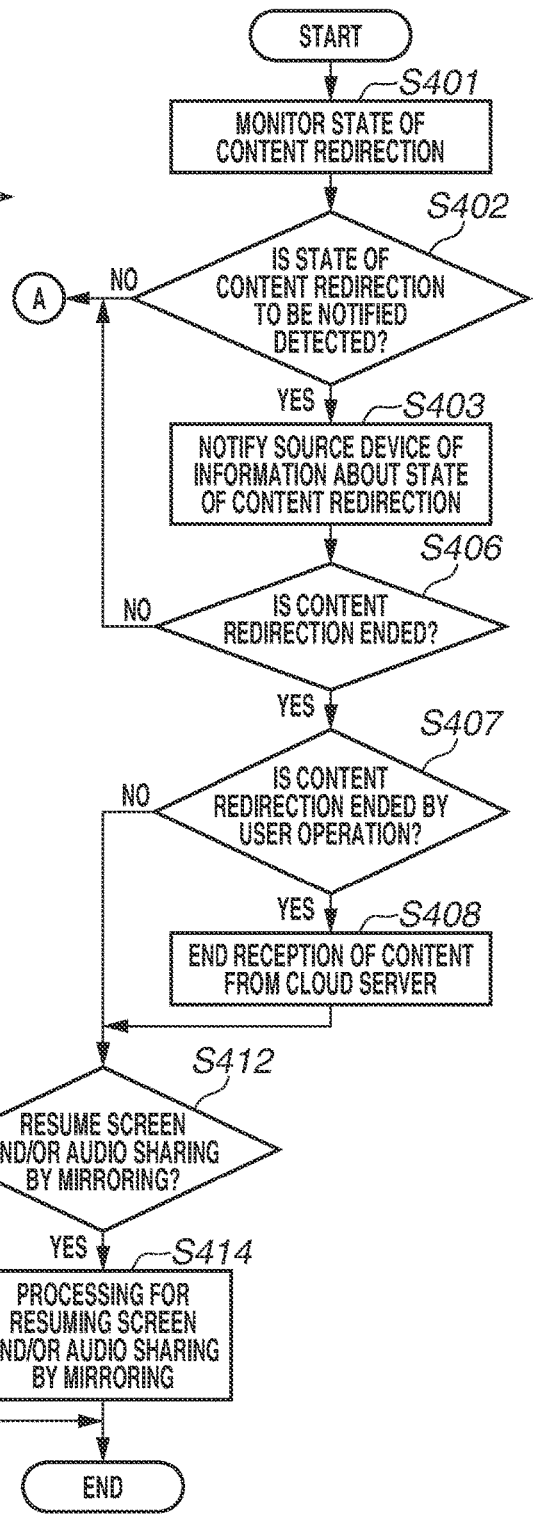

FIGS. 4A and 4B illustrate flowcharts corresponding to steps S323 and S322 of FIGS. 3A and 3B, respectively.

In step S401, the sink device monitors the state of the content redirection. In step S402, the sink device determines whether a state of content redirection to be notified to the source device is detected. Specifically, a reproduction application (for example, a browser or player) in the sink device reproducing the content monitors and determines the state of the content redirection.

As employed herein, the state of the content redirection refers to a state related to the reproduction processing of the content. Specifically, the state of the content redirection may refer to the state of content redirection by a user operation from the sink device, a state related to the reproduction of the content, and a state related to the reception of the content.

Each state will be specifically described. The state of content redirection by a user operation from the sink device refers to that of the content redirection when the user controls the content redirection by using the input unit 204 of the sink device. For example, if the user inputs an operation for suspending the content redirection into the sink device, the content redirection is suspended. The sink device detects that the user operation for suspending the content redirection is input. While suspension is used as an example of the user operation here, other reproduction control instructions such as a stop, end, playback, fast forward, and rewind may be applied.

The state related to the reproduction of the content refers to the state of the content redirection during the reproduction of the content. For example, if the content start to be reproduced, the sink device detects the time elapsed from the start of the reproduction, and notifies the source device of the elapsed time. Aside from the elapsed time, the sink device detects a reproduction speed, a reproduction direction, a reproduction position, an audio output level, a reproduction error number, and an end of reproduction of the content. As employed herein, the end of reproduction of content refers to a case where the content is reproduced to the end. The sink device may also detect whether a plurality of pieces of content is set to be continuously reproduced, and whether a piece of content is set to be repeatedly reproduced. The reproduction error number is a number indicating the type or content of an error if any error occurs in association with the reproduction of the content.

The state related to the reception of the content refers to the state of the content redirection during the reception of the content. For example, if the sink device is downloading the content, the sink device detects an estimated remaining time to the completion of the download. The sink device may also detect the progress of the download and a reception error number. The reception error number is a number indicating the type or content of an error if any error occurs in association with the reception of the content. There can be various causes for an error of content redirection. Examples include a failure of the cloud server 104, a situation such that the sink device can connect to the cloud server 104 but the content is not found, an authentication error, a timeout, and other communication failures.

The case where a state of the content redirection to be notified to the source device is determined to be detected refers to when the state of the content redirection is changed by a user operation on the sink device. However, this is not restrictive. Any of the following cases is also applicable: when the reproduction of the content ends; when a reproduction or reception error occurs; and each time a predetermined time elapses between a start and an end of the content redirection.

If a plurality of pieces of content is set to be continuously reproduced, the case where the reproduction of the content ends may refer to either when the reproduction of a piece of content ends or when the reproduction of all the pieces of content ends. A case where the reproduction of an arbitrary piece of content ends is also applicable. If at least a piece of content is set to be repeatedly reproduced, the timing when the reproduction of the content ends may refer to either when the one time reproduction of the content ends or when an arbitrary number of times of the reproduction of the content ends.

In step S402, if the sink device detects a state of the content redirection to be notified to the source device (YES in step S402), the processing proceeds to step S403. In step S403, the sink device notifies the source device of information about the state of the content redirection. The processing proceeds to step S406. In step S402, if the sink device does not detect a state of the content redirection to be notified to the source device (NO in step S402), the processing returns to step S321 of FIG. 3B described above. In step S321, the sink device continues to receive and reproduce the content.

In step S404, the source device determines whether information about a state of the content redirection is notified from the sink device. If information about a state of the content redirection is not notified (NO in step S404), the processing returns to step S404. If information about a state of the content redirection is notified (YES in step S404), the processing proceeds to step S405.

In step S405, the source device determines whether the content redirection is ended. That the content redirection is ended refers to a case where the content redirection is ended based on a user operation on the sink device, where the reproduction of the content ends because the end of the content is reached, or where an error such as a reproduction error and a reception error of the content occurs. The source device makes the determination based on the notification received in step S404. In step S406, the sink device also determines whether the content redirection is ended. The sink device makes the determination based on the result of detection in step S402.

In step S406, if the sink device determines that the content redirection is ended (YES in step S406), the processing proceeds to step S407. In step S407, the sink device determines whether the content redirection is ended by a user operation on the sink device. If the content redirection is ended by a user operation (YES in step S407), the processing proceeds to step S408. In step S408, the sink device ends the reception of the content from the cloud server 104. The processing then proceeds to step S412.

In step S407, if the content redirection is ended not by a user operation (NO in step S407), the processing proceeds to step S412. Examples of the case where the content redirection is ended not by a user operation include when the reproduction of the content ends because the end of the content is reached, and when the content redirection is ended due to an error.

In step S405, if the source device determines that the content redirection is not ended (NO in step S405), the processing proceeds to step S409. In step S409, the source device reflects the state of the content redirection on a reproduction control user interface (UI) display of the output unit 205. Specifically, if the source device is notified by the sink device of the information about the state of the content redirection, the source device displays a content redirection state display 604 illustrated in FIG. 6D. The content redirection state display 604 reflects and displays the state of the content redirection in the sink device, or partner apparatus, on a UI of reproduction control.

In such a manner, the source device can detect the state of the content redirection in the sink device. The user can learn the state of the content redirection from the content redirection state display 604 of FIG. 6D on the source device.

The user may be allowed to perform reproduction control (such as fast forward, rewind, and pause) on the content redirection from an operation unit of the source device, and the source device may notify the sink device of the user operation made via the operation unit. In such a case, the sink device performs processing of the content redirection according to the notification from the source device. The user can thereby perform the reproduction control on the content redirection from the operation unit of the source device.

On the other hand, if the source device determines that the content redirection is ended (YES in step S405), the processing proceeds to step S410. In step S410, the source device notifies the user of the end of the content redirection. For example, the source device makes the notification by displaying a message on the output unit 205.

For example, if the source device is notified that the content redirection is ended by a user operation on the sink device, the source device displays a content redirection end display screen 601 illustrated in FIG. 6A. The content redirection end display screen 601 displays a message for notifying the user that the content redirection is ended in the sink device, or partner apparatus, and a selection screen for selecting whether to resume the screen and/or audio sharing by mirroring.

With the selection screen displayed, the processing proceeds to step S411. In step S411, the source device determines whether to resume the screen and/or audio sharing by mirroring. The determination in step S411 is made based on the user's selection on the selection screen displayed on the source device in step S410.

If the user selects to resume the screen and/or audio sharing (selects YES in FIG. 6A) (YES in step S411), the processing proceeds to step S413. In step S413, the source device performs processing for resuming the screen and/or audio sharing by mirroring. On the other hand, if the user does not select to resume the screen and/or audio sharing (selects NO in FIG. 6A) (NO in step S411), the processing proceeds to step S415. In step S415, the source device performs processing for ending the screen and/or audio sharing by mirroring.

In step S412, the sink device also determines whether to perform the screen and/or audio sharing by mirroring. The determination is made based on a signal that the source device transmits in step S413 or S415. The determination coincides with that of the source device. If mirroring is to be performed (YES in step S412), the processing proceeds to step S414. If not (NO in step S412), the processing proceeds to step S416.

The case of performing the screen and/or audio sharing by mirroring will be described in detail.

In step S413, the source device transmits, to the sink device, an RTSP SET_PARAMETER message, which is a trigger to cause the sink device to transmit an RTSP PLAY message. If the sink device receives the RTSP SET_PARAMETER message, which is the trigger for the transmission of an RTSP PLAY message, from the source device, the sink device determines to perform mirroring (YES in step S412). The processing then proceeds to step S414. In step S414, the sink device issues and transmits an RTSP PLAY message according to the RTSP SET_PARAMETER message. The RTSP PLAY message is a message meaning a start of transmission of a screen. In step S311 that follows NO in step S324, the source device therefore cancels the restriction on the transmission of the screen and resumes transmitting the screen. In step S312 that follows NO in step S325, the sink device resumes receiving and reproducing the screen from the source device. In such a manner, the screen and/or audio sharing by mirroring is resumed.

The mirroring may be resumed without explicit transmission or reception of the RTSP PLAY message. In such a case, the sink device may resume receiving and reproducing the screen when the source device cancels the restriction on the transmission of the screen and resumes transmitting the screen.

Next, the case of not performing the screen and/or audio sharing by mirroring will be described in detail. Such a case applies if the user selects not to resume the screen and/or audio sharing (selects NO in FIG. 6A).

In step S415, the source device transmits an RTSP SET_PARAMETER message compliant with the Wi-Fi® Display specification to the sink device. The RTSP SET_PARAMETER message serves as a trigger for the sink device to transmit an RTSP TEARDOWN message. Here, the sink device determines that the mirroring is not resumed (NO in step S412), and the processing proceeds to step S416. In step S416, the sink device issues and transmits an RTSP TEARDOWN message according to the RTSP SET_PARAMETER message. As a result, the communication between the sink and source devices is disconnected. Specifically, the Wi-Fi® Display session is disconnected. The TCP connection and/or the Wi-Fi® P2P connection between the sink and source devices may be disconnected here. If a TDLS connection compliant with TDLS has been held as the Wi-Fi® Display connection, the TDLS connection is disconnected instead of the Wi-Fi® P2P connection.

If a predetermined time elapses without the user's instruction about whether to resume the screen and/or audio sharing, the screen and/or audio sharing may be automatically resumed. In such a case, the determination in step S411 is "YES". The user can set the duration of the timeout to an arbitrary time in advance. Setting the duration of the timeout to zero enables immediate resumption of the screen and/or audio sharing. Alternatively, if a predetermined time elapses without the user's instruction about whether to resume the screen and/or audio sharing, the screen and/or audio sharing may be automatically ended. In such a case, the determination in step S411 is "NO". Whether to resume the screen and/or audio sharing after a lapse of a predetermined time may be previously set by the user, or may be preset in the devices.

In such a manner, when an operation for ending the content redirection is detected to be made on the sink device, the source device can arbitrarily select whether to resume the screen and/or audio sharing.

Another example of the screen displayed in step S410 will be described. For example, if the source device is notified by the sink device that the reproduction of the content ends because the end of the content is reached, the source device displays a content redirection completion display screen 602 illustrated in FIG. 6B. The content redirection completion display screen 602 displays a message that the reproduction of the content is completed in the sink device, or partner apparatus, and a selection screen for selecting whether to resume the screen and/or audio sharing by mirroring. Operations when YES and NO are selected in FIG. 6B are similar to those when YES and NO are selected in FIG. 6A, respectively. A description thereof will thus be omitted.

In such a manner, when the reproduction of the content is detected to be ended in the sink device, the source device can arbitrarily select whether to resume the screen and/or audio sharing by mirroring.

Another example of the screen displayed in step S410 will be described. For example, if the source device is notified by the sink device of an error of the content redirection, the source device displays a content redirection error display screen 603 illustrated in FIG. 6C. As employed herein, an error refers to a reproduction error or a reception error. The content redirection error display screen 603 displays a message that the sink device, or partner apparatus, failed to obtain the content by the content redirection, and a selection screen for selecting whether to resume the screen and/or audio sharing by mirroring. Here, the content redirection error display screen 603 may display an error number or a message and/or an icon according to the error number. This allows the user to figure out the cause of the error and select whether to resume the mirroring on one screen. Operations when YES and NO are selected in FIG. 6C are similar to those when YES and NO are selected in FIG. 6A, respectively. A description thereof will thus be omitted.

In such a manner, with the content redirection error display screen 603 in FIG. 6C, the source device detects the occurrence of an error of the content redirection in the sink device and the cause of the error. In addition, the source device can arbitrarily select whether to resume the screen and/or audio sharing by mirroring.

Step S410 may be skipped. In such a case, an operation similar to those when YES is selected in FIGS. 6A to 6C (resumption of mirroring) is performed. An operation similar to those when NO is selected in FIGS. 6A to 6C (end operation) may be performed instead. Which operation to perform may be set in advance or may be set by the user. Here, the determination in step S411 is made not by a user operation but according to the predetermined setting or the user setting.

Instead of steps S412 to S416, the sink device may spontaneously transmit an RTSP PLAY Request to the source device after step S407 or S408. If the source device determines to resume mirroring in step S411, the source device transmits an RTSP PLAY Response including a status code of RTSP OK to the sink device as a response to the RTSP PLAY Request. The source device then lifts the restriction on the transmission of the screen and resumes transmitting the screen. The sink device receives and reproduces the screen. The screen and/or audio sharing by mirroring is thereby resumed.

On the other hand, if the source device determines not to resume mirroring in step S411, the source device transmits an RTSP PLAY Response including a status code different from RTSP OK as a response to the RTSP PLAY Request. In such a case, a status code of NG or a predetermined error number may be included. The source device then performs mirroring end processing. The sink device also performs mirroring end processing.

Alternatively, after step S407 or S408, the sink device may spontaneously transmit an RTSP TEARDOWN Request. If the source device determines to resume mirroring in step S411, the source device performs mirroring resumption processing despite reception of the RTSP TEARDOWN Request. Specifically, the source device transmits an RTSP TEARDOWN Response including a status code different from RTSP OK as a response to the RTSP TEARDOWN Request. In such a case, a status code of NG or a predetermined error number may be included. The source device then performs mirroring resumption processing. The sink device also performs mirroring resumption processing. On the other hand, if the source device determines to end mirroring in step S411, the source device transmits an RTSP TEARDOWN Response including a status code of RTSP OK to the sink device. As a result, the Wi-Fi® Display session is disconnected and the mirroring ends.

Figure 5A:
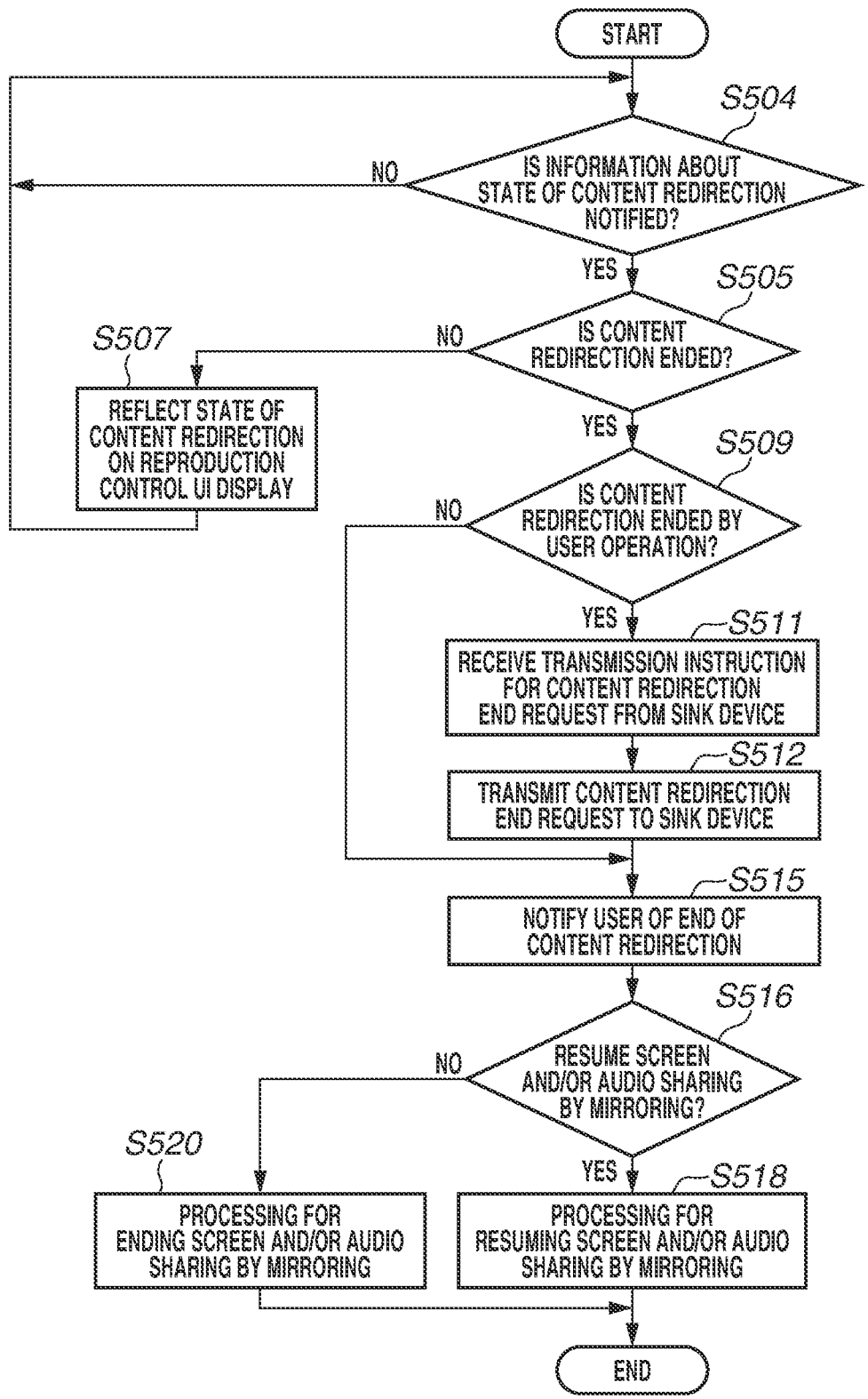
FIGS. 5A and 5B are other flowcharts to be implemented when the communication apparatus notifies the communication apparatus of the information about the state of the content redirection.
Figure 5B:
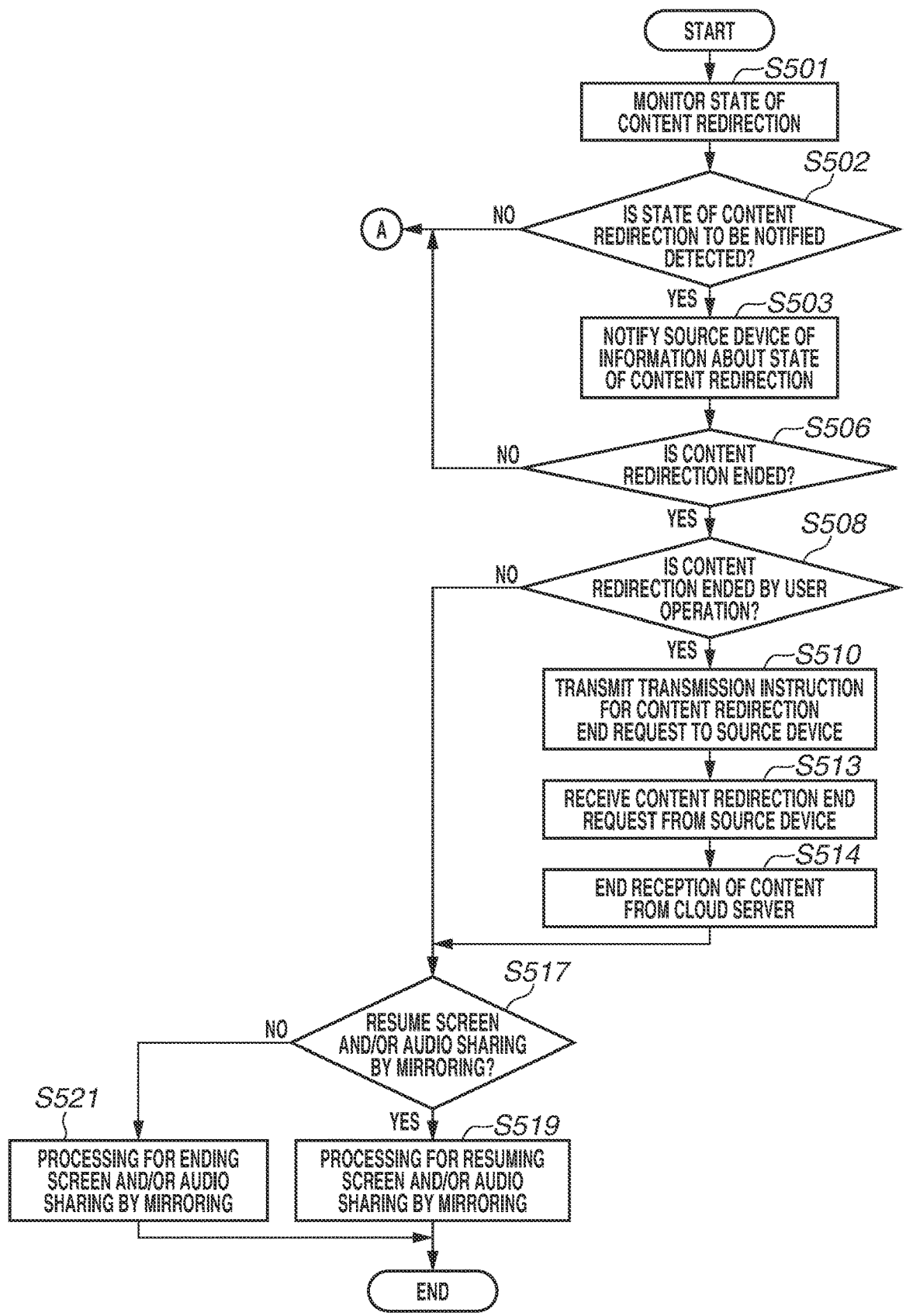

FIGS. 5A and 5B illustrate flowcharts of different processing when the sink device detects the state of the content redirection and notifies the source device of information about the state. FIGS. 5A and 5B correspond to steps S323 and S322 of FIGS. 3A and 3B, respectively. In FIGS. 5A and 5B, the sink device ends the content redirection according to a trigger from the source device.

Steps S501 to S503 and S506 of the sink device are similar to the foregoing steps S401 to S403 and S406 of FIG. 4B, respectively. A description thereof will thus be omitted. Steps S504, S505, and S507 of the source device are similar to the foregoing steps S404, S405, and S409 of FIG. 4A, respectively. A description thereof will thus be omitted.

In step S508, the sink device determines whether the content redirection is ended by a user operation on the sink device. The determination is made based on the result of detection in step S502. If the content redirection is determined to be ended by a user operation on the sink device (YES in step S508), the processing proceeds to step S510.

In step S509, the source device also determines whether the content redirection is ended by a user operation on the sink device. The determination is made based on the notification received in step S504. If the content redirection is determined to be ended by a user operation on the sink device (YES in step S509), the processing proceeds to step S511.

In step S510, the sink device instructs the source device to transmit a content redirection end request so that the processing for ending the content redirection is performed. In step S511, the source device receives the transmitted instruction.

In steps S503 and S504, the source device may transmit a content redirection end request according to the foregoing notification from the sink device to the source device. In other words, if the foregoing notification is given, the source device regards the notification as a transmission instruction for a content redirection end request. In such a case, steps S510 and S511 can be skipped.

In step S512, the source device receiving the transmission instruction in step S511 transmits a content redirection end request to the sink device. In step S513, the sink device receives the content redirection end request transmitted from the source device. In step S514, the sink device receiving the content redirection end request ends the reception of the content from the cloud server 104.

The processing then proceeds to step S517. If the content redirection is determined to be ended not by a user operation on the sink device (NO in step S508), the processing also proceeds to step S517.

After the source device transmits the content redirection end request to the sink device in step S512, the processing proceeds to step S515. If the content redirection is determined to be ended not by a user operation on the sink device (NO in step S509), the processing also proceeds to step S515.

The processing of steps S515 to S521 is similar to that of steps S410 to S416 of FIGS. 4A and 4B described above, respectively. A description thereof will thus be omitted.

As described above in the processing of the flowcharts of FIGS. 4A, 4B, 5A, and 5B, the sink device notifies the source device of the information about the state of the content redirection. The source device can thereby detect the state of the content redirection in the sink device. The source device can then autonomously perform control according to the state of the content redirection.

A plurality of pieces of content may be continuously reproduced by content redirection. In such a case, the source device is configured to be capable of specifying a piece or pieces of content to be reproduced after the one currently reproduced by the sink device during the content redirection. In step S322 of FIG. 3B, the sink device detects the end of reproduction of the content. In step S323, the source device is notified of the end of reproduction. In step S324, the source device receives the state of the content redirection. If there is content that the user wants to reproduce next, the processing returns to step S317. In step S317, the source device transmits related information about the content to the sink device. In step S318, the sink device receives the related information about the content. In step S321, the sink device receives the content from the cloud server 104. Since mirroring has been already suspended, steps S319 and S320 are skipped. Since the operations of step S322 and subsequent steps are similar to the foregoing, a description thereof will be omitted.

In the present exemplary embodiment, the mirroring processing is started before content redirection. However, content redirection may be started without the mirroring processing. Specifically, in step S301 of FIG. 3A, the source device may determine whether a start operation for content redirection is made by the user. In such a case, steps S311 to S313, S319, and S320 of FIGS. 3A and 3B are omitted.

If the content redirection ends, steps S410 and S411 of FIG. 4A and steps S515 and S516 of FIG. 5A may be omitted. In such a case, if the determination in step S405 of FIG. 4A is "YES", the processing may proceed to step S415. Similarly, if the determination in step S509 of FIG. 5A is "NO" or after step S512, the processing may proceed to step S520.

In other words, the source device may change the processing when the end of the content redirection is notified of, depending on whether mirroring precedes the content redirection or the content redirection is performed without mirroring.

In the present exemplary embodiment, the cloud server 104 only needs to hold at least one piece of content. The communication apparatuses 101 and 102 may reproduce at least one piece of content by content redirection. Further, the communication apparatus 101 may transmit related information about a plurality of pieces of content to the communication apparatus 102 in the processing of step S317 illustrated in FIG. 3A. In such a case, the communication apparatus 102 obtains and reproduces at least one piece of content from the cloud server 104 base on the obtained related information about the plurality of pieces of content.

The steps of the flowcharts illustrated in FIGS. 3A to 5B may be performed by a not-illustrated plurality of CPUs or apparatuses in a distributed manner. If the steps are performed by a plurality of apparatuses in a distributed manner, the source devices operate as a source system and the sink devices a sink system.

The exemplary embodiment has been described in detail above. However, exemplary embodiments can include a system, an apparatus, a method, a program, and a recording medium (storage medium). Specifically, an exemplary embodiment can be applied to a system including a plurality of devices (such as a host computer, an interface device, an imaging apparatus, and a web application). An exemplary embodiment can be applied to an apparatus including a single device.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an exemplary embodiment, an apparatus configured to transmit information about content stored in an external apparatus can autonomously perform control according to a state about reproduction processing of the content in a destination to which the information is transmitted.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-050380, filed Mar. 15, 2017, which is hereby incorporated by reference herein in its entirety.

What is claimed is:

1. A communication apparatus comprising:
one or more processors; and
one or more memories including instructions that, when executed by the one or more processors, cause the communication apparatus to:
transmit at least screen data generated based on a screen being displayed or audio data generated based on audio being reproduced by the communication apparatus to another communication apparatus;
transmit information for acquiring content stored in an external apparatus to the another communication apparatus;
stop the transmission of at least the screen data or the audio data, in a case where transmission of the information for acquiring the content is instructed while at least the screen data or the audio data is being transmitted;
detect an end of reproduction processing of the content in the another communication apparatus; and
accept a user instruction for selecting whether to resume, in a case where the end of the reproduction processing of the content in the another communication apparatus is detected after stopping the transmission of at least the screen data or the audio data, the stopped transmission of at least the screen data or the audio data.

2. The communication apparatus according to claim 1, wherein the execution of the instructions further causes the communication apparatus to: resume, in a case where the end of the reproduction processing of the content in the another communication apparatus is detected after stopping the transmission of at least the screen data or the audio data and where a user instruction for selecting to resume the transmission of at least the screen data or the audio data is accepted, the transmission of at least the screen data or the audio data; and
disconnect, in a case where the end of the reproduction processing of the content in the another communication apparatus is detected after stopping the transmission of at least the screen data or the audio data and where a user instruction for selecting not to resume the transmission of at least the screen data or the audio data is accepted, wireless communication with the another communication apparatus.

3. The communication apparatus according to claim 1, wherein the information for acquiring the content is an identifier of the content.

4. The communication apparatus according to claim 1, wherein the execution of the instructions further causes the communication apparatus to:
receive information corresponding to the end of the reproduction processing of the content in the another communication apparatus from the another communication apparatus,
wherein the communication apparatus detects the end of reproduction processing of the content in the another communication apparatus based on the received information.

5. The communication apparatus according to claim 4, wherein the information corresponding to the end of the reproduction processing of the content is information indicating that the another communication apparatus accepts a user operation for instructing an end of reproduction of the content.

6. The communication apparatus according to claim 4, wherein the information corresponding to the end of the reproduction processing of the content is information indicating that the content are reproduced to an end by the another communication apparatus.

7. The communication apparatus according to claim 4, wherein the information corresponding to the end of the reproduction processing of the content is information indicating occurrence of a reception error of the content in the another communication apparatus.

8. The communication apparatus according to claim 4, wherein the information corresponding to the end of the reproduction processing of the content is information indicating occurrence of a reproduction error of the content in the another communication apparatus.

9. The communication apparatus according to claim 1, wherein the execution of the instructions further causes the communication apparatus to: provide display based on information, received from the another communication apparatus, about a state related to the reproduction processing of the content.

10. The communication apparatus according to claim 1, wherein the communication apparatus establishes a Wi-Fi® P2P connection with the another communication apparatus.

11. The communication apparatus according to claim 1, wherein the communication apparatus establishes a Wi-Fi® Display session with the another communication apparatus.

12. The communication apparatus according to claim 1, wherein the communication apparatus performs communication compliant with an IEEE 802.11 series specification with the another communication apparatus.

13. The communication apparatus according to claim 1, wherein the communication apparatus transmits at least the screen data or the audio data in compliance with a Wi-Fi Certified Miracast™ specification.

14. The communication apparatus according to claim 4, wherein the execution of the instructions further causes the communication apparatus to: transmit, in a case where the information corresponding to the end of the reproduction processing of the content in the another communication apparatus has been received from the another communication apparatus, an end request that causes the another communication apparatus to end receiving the content stored in the external apparatus.

15. The communication apparatus according to claim 1, wherein the execution of the instructions further causes the communication apparatus to:

display a screen to accept a user instruction for selecting whether to resume, in a case where the end of the reproduction processing of the content in the another communication apparatus is detected after stopping the transmission of at least the screen data or the audio data, the stopped transmission of at least the screen data or the audio data.

16. A method for controlling a communication apparatus, comprising:

transmitting, at least screen data generated based on a screen being displayed or audio data generated based on audio being reproduced by the communication apparatus to another communication apparatus;

transmitting, information for acquiring content stored in an external apparatus to the another communication apparatus;

stopping, the transmission of at least the screen data or the audio data, in a case where transmission of the information for acquiring the content is instructed while at least the screen data or the audio data is being transmitted;

detecting an end of reproduction processing of the content in the another communication apparatus, in a case where the information for acquiring the content is transmitted; and accepting a user instruction for selecting whether to resume, in a case where the end of the reproduction processing of the content in the another communication apparatus is detected after stopping the transmission of at least the screen data or the audio data, the stopped transmission of at least the screen data or the audio data.

17. A non-transitory computer-readable storage medium storing a computer program for causing a computer to execute a control method of a communication apparatus, the control method comprising:

transmitting, at least screen data generated based on a screen being displayed or audio data generated based on audio being reproduced by the communication apparatus to another communication apparatus;

transmitting, information for acquiring content stored in an external apparatus to the another communication apparatus;

stopping, the transmission of at least the screen data or the audio data, in a case where transmission of the information for acquiring the content is instructed while at least the screen data or the audio data is being transmitted;

detecting an end of reproduction processing of the content in the another communication apparatus, in a case where the information for acquiring the content is transmitted; and accepting a user instruction for selecting whether to resume, in a case where the end of the reproduction processing of the content in the another communication apparatus is detected after stopping the transmission of at least the screen data or the audio data, the stopped transmission of at least the screen data or the audio data.

* * * * *